(12) United States Patent
Simske

(10) Patent No.: US 7,840,028 B2
(45) Date of Patent: Nov. 23, 2010

(54) AUTHENTICATION SYSTEM AND METHOD

(75) Inventor: Steven J. Simske, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 968 days.

(21) Appl. No.: 11/668,670

(22) Filed: Jan. 30, 2007

(65) Prior Publication Data

US 2008/0181451 A1    Jul. 31, 2008

(51) Int. Cl.
*G06K 9/00* (2006.01)
(52) U.S. Cl. .................................... 382/100; 382/101
(58) Field of Classification Search .......... 382/100, 382/101; 358/3.28; 713/176; 235/375, 491; 84/645

See application file for complete search history.

(56) References Cited

U.S. PATENT DOCUMENTS

| | | | |
|---|---|---|---|
| 6,701,005 B1 | 3/2004 | Nichani | |
| 6,718,048 B1 | 4/2004 | Kawata et al. | |
| 6,751,336 B2 | 6/2004 | Zhao | |
| 7,088,862 B1 | 8/2006 | Silver et al. | |
| 7,130,444 B2 * | 10/2006 | Honsinger et al. | 382/100 |
| 7,139,421 B1 | 11/2006 | Fix et al. | |
| 2006/0202470 A1 | 9/2006 | Simske et al. | |
| 2007/0024915 A1 | 2/2007 | Simske et al. | |
| 2007/0096865 A1 | 5/2007 | Simske et al. | |

OTHER PUBLICATIONS

Packaging Today, Review News, "Phones could cut counterfeiting," Nov. 2006, p. 5.
U.S. Appl. No. 11/465,763, filed Aug. 18, 2006, Simske et al.
U.S. Appl. No. 11/414,113, filed Apr. 28, 2006, Simske et al.

* cited by examiner

*Primary Examiner*—Anh Hong Do

(57) ABSTRACT

An authenticating system includes an object, an authentication service, a segmentation system, and an analysis system. The object includes a plurality of steganographic instruments on a visible portion of the object. The authentication service is configured to receive a digital image of at least one of the plurality of steganographic instruments. The segmentation system is configured to extract the at least one of the plurality of steganographic instruments for analysis. The analysis system is configured to determine if the at least one extracted steganographic instrument corresponds to at least one registered steganographic instrument.

22 Claims, 1 Drawing Sheet

AUTHENTICATION SYSTEM AND METHOD

BACKGROUND

The present disclosure relates generally to authenticating systems and methods.

Security packaging is an important component of product tracking and authenticating, as well as of anti-counterfeiting initiatives. Security packaging involves providing each package with a unique ID, in the form of, for example, a deterrent or mark. Some current identifying/authenticating techniques incorporate the analysis of a digital image of the unique ID. However, such techniques may be deleteriously impacted by the fact that the authentication systems used are configured for analysis of a single type of ID. Furthermore, such systems may not be designed for accommodating imprecise digital images. As such, a user would generally need pre-knowledge of the exact location of the unique ID on the package in order to transmit an image that includes the unique ID to be analyzed. In an effort to assist the user in finding the unique ID, marks (e.g., fiducial marks) identifying suitable scan positions or identifying the location of the ID have been included on the package. Such static IDs and placement thereof may lead to undesirable, facile detection and reproduction of the mark(s) by potential counterfeiters.

BRIEF DESCRIPTION OF THE DRAWINGS

Objects, features and advantages of embodiments of the present disclosure will become apparent by reference to the following detailed description and drawings, in which like reference numerals correspond to similar, though not necessarily identical, components. For the sake of brevity, reference numerals having a previously described function may not necessarily be described in connection with subsequent drawings in which they appear.

DETAILED DESCRIPTION

Embodiments of the method and system disclosed herein automatically analyze digital images of one or more steganographic instruments that are visible on an object/package, and extract any available information therefrom. The system is advantageously capable of simultaneously reading a plurality of instruments, of distinguishing between instruments, and of ignoring those instruments that are not recognized as being registered with the system. Embodiments of the system and method disclosed herein are advantageously useful for one or more of object inspection, authentication, and qualification.

Figure 1:
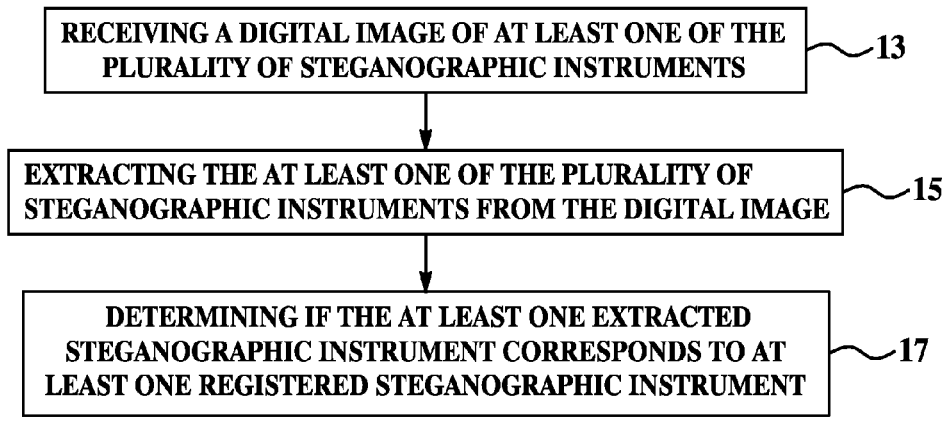
FIG. 1 is a flow diagram depicting an embodiment of a method for authenticating an object having a plurality of variable instruments on a visible portion thereof.

Referring now to FIG. 1, a flow diagram depicting an embodiment of a method for authenticating an object having a plurality (i.e., two or more) of steganographic instruments on a visible portion thereof is depicted. The method generally includes receiving a digital image of at least one of the plurality of steganographic instruments, as shown at reference numeral 13; extracting the at least one of the plurality of steganographic instruments from the digital image, as shown at reference numeral 15; and determining if the at least one extracted steganographic instrument corresponds to at least one registered steganographic instrument, as shown at reference numeral 17. It is to be understood that embodiments of the method shown in FIG. 1 are described further hereinbelow.

Figure 2:
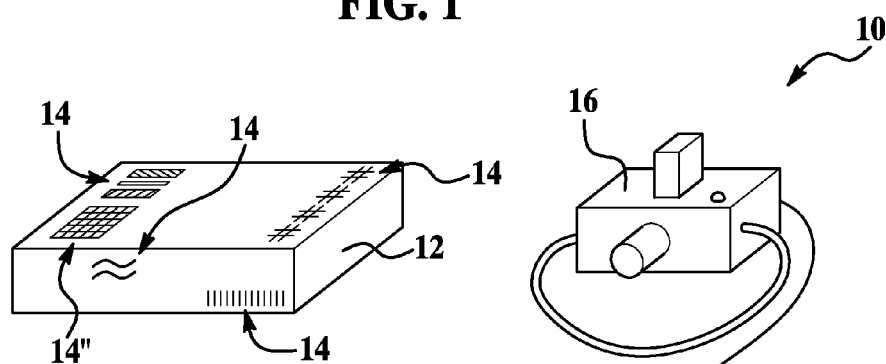
FIG. 2 is a schematic diagram depicting an embodiment of an authenticating system and a method for authenticating an object having a plurality of variable instruments on a visible portion thereof.
Figure 2:
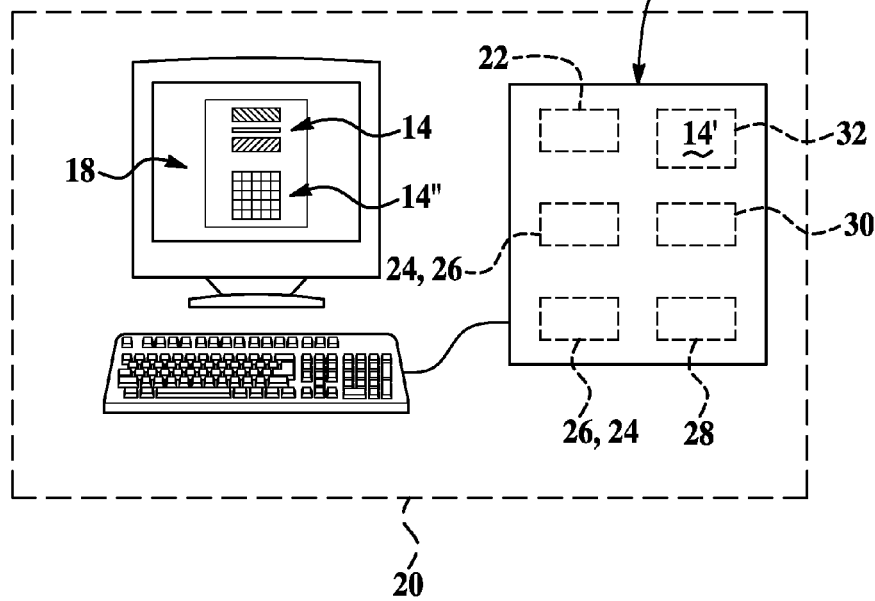

Referring now to FIG. 2, an embodiment of an authenticating system 10 and a method for authenticating an object 12 are shown schematically.

It is to be understood that the term "object" as used herein is to be interpreted broadly and may include, but is not limited to any type of object, product, or package. Likewise, the term "package" is to be interpreted broadly herein to include any unit for containing a product, displaying a product, or otherwise identifying a branded good. Non-limitative examples of such packages include boxes, bags, containers, clamshells, bands, tape, wraps, ties, or the like, or combinations thereof.

As mentioned in reference to FIG. 1, the object 12 contains a plurality of steganographic instruments 14. It is to be understood that the term "steganographic instrument" as used herein is defined as a feature that is visible to the naked eye, but may contain information of interest hidden or obscured therein. The steganographic instruments 14 may include, but are not limited to graphical indicia, alphanumeric indicia, or combinations thereof. In a non-limiting embodiment, the steganographic instruments 14 are selected from color lines, fingerprints, color text, copy detection patterns (CDP), color tiles, letter sequences, number sequences, graphic sequences, target patterns, bar codes, and the like, and combinations thereof. It is contemplated as being within the purview of the present disclosure that the steganographic instruments 14 may be variable, i.e., the steganographic instruments 14 on one object 12 are different than one or more instruments 14 on any other object 12. Furthermore, it is to be understood that any combination of the types of instruments 14 may be incorporated on an object 12. In one embodiment, none of the plurality of instruments 14 is a bar code.

As non-limiting examples, the instruments 14 may be formed of spectrally opaque ink, spectrally transparent ink, ultraviolet ink, infrared ink, thermochromatic ink, electrochromatic ink, electroluminescent ink, conductive ink, magnetic ink, color-shifting ink, quantum dot ink, phosphorescent ink, a guilloche, a planchette, holographs, security threads, watermarks, other security deterrents, anti-tamper deterrents, and combinations thereof.

It is to be understood that any of the steganographic instruments 14 may contain information. In some embodiments, the information hidden within the steganographic instrument 14 is authenticating information, security information, or both. The information hidden within an instrument 14 may be for tracking, branding, or the like, or various combinations thereof. In other embodiments, the information hidden within an instrument 14 is decoy information meant to mislead an unintended recipient of that information. In still other embodiments, no information is hidden within the steganographic instrument 14. It is also to be understood that a single instrument 14 may have hidden therein any combination of the above, as desired; for example, an instrument 14 may have hidden therein authenticating, security and tracking information, as well as some decoy information.

Further, it is to be understood that the information may be, for example, a code; a sequence of bits, bytes, characters, colors, graphics, numbers, etc.; a watermark; symbols; interpretable information; a fingerprint(s); other biometric data (e.g., palin, encoded, encrypted, scrambled, chained to other information); a "payload;" modulation transfer functions (e.g., used in conjunction with a target pattern); or the like; or combinations thereof. A payload is usually a short (8-32 bit) message stored in the instrument(s) 14. Examples of instruments 14, information contained within such instruments 14, or combinations thereof are described further in the following patent applications, each of which is incorporated herein by reference in its entirety: U.S. patent application Ser. No. 11/465,763 filed Aug. 18, 2006; Ser. No. 11/414,113 filed Apr. 28, 2006; Ser. No. 11/076,534 filed Mar. 8, 2005; and Ser. No. 11/192,878 filed Jul. 29, 2005.

As briefly referenced above, some instruments 14 may be decoy instruments which appear to contain information (e.g., a barcode), when, in reality, it contains no information or misleading information. A decoy instrument may also be capable of providing authenticating/security capabilities for some authenticating systems, but is not used in a particular authenticating system 10 of interest. As such, in an embodiment, the primary (or sole) purpose of a decoy instrument may be to evade a potential counterfeiter, to allow for the nature of the information to be altered without changing the in-place instruments, or combinations thereof. Intentionally inactive instruments are further described in U.S. patent application Ser. No. 11/264,179 filed Nov. 1, 2005, which is incorporated herein by reference in its entirety.

As shown in FIG. 2, the digital image 18 of one or more of the instruments 14 is captured using an electronic device 16. As shown in FIG. 2, the electronic device 16 is a digital camera. It is to be understood that the digital camera may be embodied in, for example, a cellular phone, a personal digital assistant, or the like. Another suitable electronic device 16 is a scanner, an inspection camera, a tabletop imager, or the like.

The digital image 18 of the object 12 is then transmitted from the electronic device 16 to an authentication service 20. Generally, the authentication service 20 includes a segmentation system 22, an analysis system 24, an information extraction system 26, a verification system 28, and a notification system 30. Very generally, the segmentation system 22 identifies different zones or regions from the digital image 18 (at least one of which contains instrument(s) 14); the analysis system 24 classifies the zones (and instrument(s) 14 therein) by comparing their attributes to attributes of registered instruments (referred to as 14' and discussed further hereinbelow); the information extraction system 26 includes software to read and extract any information from instruments 14" (discussed further hereinbelow) found to correspond with registered instruments 14'; the verification system 28 compares the extracted information to stored information; and the notification system 30 sends message(s) to a user that is/are indicative of a success or a failure to authenticate the object 12.

It is to be understood that the systems 22, 24, 26, 28, 30 within the authentication service 20 may be configured as a computer program, an Internet enabled program, or the like. Generally, the various systems 22, 24, 26, 28, 30 are operatively connected or configured so as to function as a single authentication service 20.

Upon receiving the digital image 18, the segmentation system 22 identifies different zones or regions from the image 18. As a non-limiting example, the segmentation system 22 divides the image 18 into area(s) that contain instruments 14, and areas that do not contain instrument(s) 14. By dividing up the image 18, the segmentation system 22 essentially extracts the instruments 14 from the digital image 18 for further analysis. It is to be further understood that the system 22 may identify a different zone for each instrument 14, or may identify different zones for like instruments 14. As a non-limiting example of segmentation of a digital image 18 containing one instrument 14, the segmentation system 22 may identify a zone containing the instrument 14, and another zone containing non-instruments 14 (e.g., empty space on the object 12, product identifying information, etc.), thereby extracting the instrument 14 for analysis. It is to be further understood that areas of the object 12 that do not contain instruments 14 may be ignored during segmentation.

The analysis system 24 then reviews each of the identified zones for steganographic instrument(s) 14" that correspond with registered steganographic instrument(s) 14'. When scanning each zone of the digital image 18, the analysis system 24 uses a set of predetermined criteria or attributes to search for instruments 14" matching such criteria or attributes. It is to be understood that the analysis system 24 is capable of searching for such instruments 14" without the use of fiducial marks or any other a priori description of the layout. In an embodiment, the analysis system 24 scans the zone(s) identified from the digital image 18 for those steganographic instruments 14" which correspond with instruments 14' registered with the authentication service 20.

Steganographic instruments 14 may be registered (registered instruments are designated at reference numeral 14') with the authentication service 20 by the individual or entity manufacturing, packaging, supplying, and/or selling the object 12 having the instrument 14 thereon. The individual or entity generally provides the instrument 14 to the authentication service 20 for description and registration, though in other embodiment(s), other individual(s) or entities may provide the instrument(s) 14 to the authentication service 20.

The individual or entity may also provide an instrument 14 to the authentication service 20 with instructions that the instrument 14 is not to be registered. In this embodiment, the individual or entity may not wish to use the instrument 14 for authentication or security purposes, but may wish to inform the service 20 that such non-registered instruments 14 may appear on objects 12 associated with the individual or entity.

Upon receiving the instrument 14 for registration, the service 20 describes the instrument 14 either automatically or manually, based on the relative obviousness of the instrument features. Automatic description generally means that a candidate set of instrument attributes are evaluated using a classifier (such as a Gaussian classifier) to determine which attributes best distinguish the instrument 14 from registered instruments 14'. Manual description generally means that the designer of the instrument 14 describes a set of attributes that, if met, define the instrument 14. As an example, a color line instrument 14 may be defined by the following attributes: width, height, width/height (aspect) ratio, white/background percent content, spacing, spacing frequency (e.g., 2D FFT), and saturation of non-white pixels. The attributes are also used (for example, during analysis) to distinguish the instrument 14 of interest from other instruments (registered 14' or non-registered 14) and from areas that do not contain instruments 14 (e.g., non-deterrent regions of the object 12, including product identification text, spot colors, or the like, or combinations thereof).

Once a set of attributes is designated for the instrument 14, the attributes are compared against an extant pool of already registered instruments 14'. If the newly-defined set is unique, the instrument 14 is added to the pool of registered instruments 14'. If the attribute set is not unique, the individual or entity may be notified that the instrument 14 is not unique and that it should be altered. In another embodiment when the attribute set is not unique, additional instrument attributes may be added or created by the authentication service 20. In still another embodiment when the attribute set is not unique, the instrument 14 may be registered and marked as a potential conflict, which is resolved downstream by speculative-authentication of the region (containing an instrument 14" that corresponds with the instrument 14') with a plurality of authentication algorithms.

Speculative authentication generally involves authenticating the instrument 14" by assuming or speculating that the instrument 14" corresponds with the registered instrument 14' whose set of attributes best matches those of the instrument 14". For example, if two or more registered instruments 14' are suspected of corresponding with the instrument 14" being analyzed, then the set of attributes of the registered instrument 14' most closely matching those of the instrument 14" is considered to be the registered instrument 14' to be used for authentication purposes. Speculative authentication is used when an instrument 14 potentially matches two or more registered instruments 14'. The service 20 is configured to select the instrument 14' that passes the comparison with the highest confidence. Generally, the service 20 includes authentication algorithms that provide a measure of confidence authentication or a pass/fail authentication.

In another embodiment, a set of two or more instruments 14 may be sent to the authentication service 20 together for registration as a class. The attributes of the instruments 14 within the set are described (automatically or manually), and compared to attributes of the registered instruments 14'. If the combination of the attributes is found to be unique, it is registered as being descriptive of the particular class of instruments 14'.

It is to be understood that within the authentication service 20, the registered steganographic instrument(s) 14' may be linked to other registered steganographic instruments 14', to the information that is to be contained therein, and/or to one or more types of information that is/are to be contained therein. For example, the individual or entity registering the steganographic instrument 14' may indicate that authentic objects 12 bearing an instrument 14" corresponding to the registered instrument 14' will contain a particular piece of information therein; and/or the object 12 will contain another instrument 14" corresponding to another registered instrument 14' (which may or may not have information contained therein).

Such linking allows numerous instruments 14" and/or information contained therein to be to be chained together to produce a hybrid or combination instrument. A non-limiting example of such a hybrid or combination instrument includes one instrument 14" whose overt appearance is difficult to reproduce chained to another instrument 14" whose hidden information (e.g., weak watermarks, guilloches, or the like, or combinations thereof) is difficult to copy.

The registered instrument(s) 14' and any information corresponding therewith (e.g., hidden information, information regarding a linked instrument 14', etc.) may be maintained at the authentication service 20, for example, via a record or file 32. The record 32 may contain a security campaign, which includes, for example, a plan for the instrument(s) 14' to be used in a particular print job, and how to sequence the information that is contained therein. The security campaign may also incorporate a set of instruments 14' (e.g., overt, covert, and/or forensic instruments 14') that are used to secure and/or authenticate the product 12 associated therewith, and identify how the information, if any, is placed into the entire set of instruments 14'.

In one embodiment, the segmentation system 22 facilitates the identification of zones by preprocessing image 18. In particular, segmentation system 22 may create a raster from the image 18, and then apply a threshold to the raster to clear it of any undesirable background pixels. The segmentation system 22 then run-length smears the image 18 enough to substantially prevent formation of an abundance of small regions, and to merge regions separated by relatively small gaps. In an embodiment, run-length smearing is accomplished at $2/75$ (or $8/300$) of an inch. The image 18 is then thinned (i.e., shrunk along its boundaries) and fattened (i.e., expanded along its boundaries) to remove single-pixel width noise without affecting large regions that are not so removed. Smearing is then performed with a calculated smear value. Any additional noise is removed along the edge of the image 18. The different zones or regions of the image 18 are then identified for analysis. Each zone may contain a different instrument 14", a plurality of similar instruments 14", a plurality of different instruments 14", or no instruments 14" at all (the latter of which is ignored by the analysis system 24).

Upon segmentation of received digital image 18, the analysis system 24 scans each zone of the digital image 18 (containing instruments 14 that have been extracted via segmentation system 22) for instruments 14" that correspond to registered steganographic instruments 14'. The analysis system 24 searches for the corresponding instruments 14" within a particular zone of the digital image 18 using a specific set of criteria, or by searching all registered instruments 14'. The analysis system 24 will identify those instruments 14" that meet the search criteria and correspond to a registered instrument 14'. As a non-limiting example, a color line instrument 14 and a color tile instrument 14" are both present in the digital image 18 (as shown in FIG. 2), and the color tile instrument 14" corresponds with a registered instrument 14'. In this example, it is to be understood that the segmentation system 22 identifies a zone that includes both of the instruments 14, 14". If the search criteria used for searching this zone of the digital image 18 is "all registered instruments 14'," the analysis system 24 will identify the color tile instrument 14" because it corresponds to a registered instrument 14'.

If the analysis system 24 determines that a particular zone or the digital image 18 as a whole is unusable or a registered steganographic image 14' is not found, the service 20 will request that the user transmit another digital image 18. As a non-limiting example, if the digital image 18 includes all non-registered instruments 14 (such as the color line instrument 14 previously discussed), the analysis system 24 signals the notification system 30 to inform the sender of the digital image 18 that no instruments 14" corresponding to registered instruments 14' are found, and that it may be desirable to transmit a digital image 18 of other instrument(s) 14 on the object 12. As other non-limiting examples, the quality of the image 18 may be too grainy for segmentation, one or more of the instruments 14 of interest may be truncated in the image 18, or the like, or combinations thereof. The service 20 (via notification system 30) is capable of informing the image sender of the problem with the received digital image 18, and of requesting that another digital image 18 be transmitted.

Once the corresponding instrument(s) 14" is/are identified, the instrument(s) 14" is/are analyzed via information extraction system 26 to determine if information is contained therein. Determining if information is present within the instrument(s) 14" may be performed by any suitable means (which is associated with the information extraction system 26) such as, for example, visible scanning, UV scanning, IR scanning, or any other system or method suitable to acquire information from the instruments 14", such as by reading, scanning, polling, or the like, or combinations thereof. The information extraction system 26 generally has the ability to acquire information in more than one mode or format, such as may be required when scanning instrument(s) 14" embodied in more than one form, encrypted with more than one type of information, or combinations thereof. The information extraction system 26 is capable of performing multi-location driven reading, which may include two or more consecutive visual scans.

In one embodiment, the information extraction system 26 determines that the instrument(s) 14" contains no information. When such a determination is made, the information extraction system 26 transmits a message to the notification system 30, which is configured to notify the image sender of the lack of information. The notification system 30 is capable of transmitting such information, for example, via email, instant messaging, text messaging, or the like, or various combinations thereof.

In another embodiment, the information extraction system 26 determines that the instrument(s) 14" contain information. Such information is then extracted (e.g., de-coded, de-sequenced) from the instrument 14" for further analysis. In an embodiment, the information extraction system 26 is capable of converting the image of the instrument 14" into an image of the information (e.g., payload, sequence, identifier) contained within the instrument 14". Generally, the method of extraction is related to the manner in which the information is encoded in the instrument 14". For example, if the information is encoded using UV ink, a UV scanning method is one example of a suitable method of extraction. The information extraction system 26 may be configured so that the information is extracted substantially simultaneously with the determination that the information is present. As used herein, the term "substantially simultaneously" generally refers to a lapse of time ranging from about 10 msec to about 1000 msec between tasks performed by the system 10 or the service 20.

The verification system 28 of the service 20 is used to compare the extracted or acquired information from the instrument 14" with any information on-file for the corresponding registered instrument 14'. Upon comparison, if the on-file information matches the acquired information, authenticity of the instrument 14" (and thus the object 12) is verified. In such an instance, the notification system 30 informs the image sender that authenticity has been verified. Conversely, if the on-file information does not match the acquired information, an image sender may receive notice of non-authenticity of the instrument 14".

It is to be further understood that a set of instruments 14" found to correspond with registered instruments 14' may be analyzed substantially simultaneously. As a non-limiting example, a product packaging company is authorized to package a supplier's product in a package/object 12 that is intended to bear instrument(s) 14" visibly thereon that correspond to the supplier's registered instrument(s) 14' (which, in this example, contain hidden information). Prior to shipping the packaged product, the supplier may wish to verify that the packaging company used the authentic package/object 12. The supplier may capture a single (or multiple) digital image(s) 18 containing each of the instruments 14" (i.e., a class of instruments 14") to be verified (which, if incorrect or tampered with, would be instrument(s) 14).

As previously stated, the service 20 is capable of processing all of the instruments 14" (and/or 14) within a zone identified by the segmentation system 22 substantially simultaneously. If the analysis system 24 determines that any of the instruments 14 in the image 18 do not correspond to registered instruments 14', the service 20 will segment out and ignore such instruments 14. Similarly, if any of the instruments 14" in the image 18 do correspond to registered instruments 14', the service 20 will segment out and further analyze such instruments 14" for information potentially contained therein (as described above). It is to be understood that the image sender (in this example, the supplier) will be notified if any of the instruments 14 do not correspond with a registered instrument 14'. If the supplier knows that the instruments 14" sent to the product packaging company should correspond to registered instruments 14', such a notification would indicate that the instruments 14" were deleteriously affected (e.g., the package/object 12 is damaged) or tampered with.

For instruments 14" that correspond with registered instruments 14' and are further analyzed, the information acquired for each of the instruments 14" is compared with on-file information. The results of the analysis and verification are then transmitted to the supplier. Even if the information in every instrument 14" is not authenticated, the results may statistically qualify the objects 12 for deployment.

In another embodiment, a class of instruments 14 may be authenticated when different instrument(s) 14 within the class is/are contained in different images 18. As a non-limiting example, three different registered instruments 14' are part of a single class. Each of the three Instruments 14 (which may be instruments 14" that correspond to the registered instruments 14') is visible on the object 12 of interest. In requesting verification of the authenticity of the object 12, a user sends three different images 18, one containing the first instrument 14, another containing the second instrument 14, and still another containing the third instrument 14. The authentication service 20 analyzes each of the images 18 separately to determine if each instrument 14 does in fact correspond (i.e., is instrument 14") to a registered instrument 14'. During analysis, the service 20 verifies that the information contained in the first instrument 14" belongs to a pallet, lot, class, etc., and verifies its authenticity for the particular registered class. The service 20 performs a similar analysis for the second and third instruments 14". This type of analysis allows for increased statistical assurance of the authenticity of the object 12, even if each individual image 18 has less than the full repertoire of instruments 14 authenticated.

Embodiments of the method and system 10 disclosed herein advantageously allow for the segmentation and analysis of multiple instruments 14, 14" substantially simultaneously. Such a system 10 allows for bulk identification, authentication, and/or qualification. The system 10 and method disclosed herein also advantageously allow for different levels of authentication. For example, determining that one instrument 14" corresponds to a registered instrument 14' and contains the same information thereon may be acceptable for authentication. Alternatively, one may specify that an entire class (or a certain percentage thereof) of instruments 14" corresponds to a class of registered instruments 14' for authentication to be verified.

While several embodiments have been described in detail, it will be apparent to those skilled in the art that the disclosed embodiments may be modified. Therefore, the foregoing description is to be considered exemplary rather than limiting.

What is claimed is:

1. An authenticating system, comprising:
   an object including a plurality of steganographic instruments on a visible portion of the object;
   an authentication service configured to receive a digital image of at least one of the plurality of steganographic instruments;
   a segmentation system configured to extract the at least one of the plurality of steganographic instruments for analysis; and
   an analysis system configured to determine if the at least one extracted steganographic instrument corresponds to at least one registered steganographic instrument.

2. The authenticating system as defined in claim 1, further comprising an information extraction system configured to determine if the at least one extracted steganographic instrument contains information, and to extract the information if the at least one extracted steganographic instrument is found to contain such information.

3. The authenticating system as defined in claim 2 wherein the information is security information.

4. The authenticating system as defined in claim 3, further comprising a system configured to verify authenticity of the object via the security information.

5. The authenticating system as defined in claim 4, further comprising a notification system configured to inform a user of the authenticity of the object.

6. The authenticating system as defined in claim 1 wherein the information is selected from a code, a sequence of bits, a sequence of bytes, a sequence of characters, a sequence of colors, a sequence of graphics, a sequence of numbers, a watermark, symbols, interpretable information, biometric data, and combinations thereof.

7. The authenticating system as defined in claim 1, further comprising a notification system configured to inform a user whether the at least one extracted steganographic instrument corresponds with the at least one registered steganographic instrument.

8. The authenticating system as defined in claim 1 wherein at least one of the plurality of steganographic instruments is encrypted, chained, or combinations thereof.

9. The authenticating system as defined in claim 1, further comprising a record configured to store data pertaining to the at least one registered steganographic instrument.

10. A method for authenticating an object having a plurality of steganographic instruments on a visible portion thereof, the method comprising:
   receiving, at an authentication service, a digital image of at least one of the plurality of steganographic instruments;
   extracting, via a segmentation system, the at least one of the plurality of steganographic instruments from the digital image; and
   determining, via an analysis system, if the at least one extracted steganographic instrument corresponds to at least one registered steganographic instrument.

11. The method as defined in claim 10, further comprising transmitting the digital image from a user to the authentication service that receives the digital image.

12. The method as defined in claim 11 wherein after receiving the digital image, the method further comprises requesting that an other digital image be transmitted from the user.

13. The method as defined in claim 10, further comprising:
   determining, via an information extraction system, whether the at least one extracted steganographic instrument contains information; and
   if the at least one extracted steganographic instrument contains information, extracting, via the information extraction system, the information from the at least one extracted steganographic instrument.

14. The method as defined in claim 13 wherein the information is security information, and wherein the method further comprises verifying authenticity of the object via the security information.

15. The method as defined in claim 14, further comprising notifying, via a notification system, a user of the authenticity of the object.

16. The method as defined in claim 13, further comprising notifying, via a notification system, a user that the at least one extracted steganographic instrument does not contain information.

17. The method as defined in claim 10 wherein the digital image is received at the authentication service, and wherein prior to receiving the digital image, the method further comprises:
   registering a steganographic instrument with the authentication service; and
   storing the registered steganographic instrument as part of a security campaign.

18. The method as defined in claim 17 wherein a plurality of steganographic instruments is registered together as a class.

19. The method as defined in claim 10 wherein extracting includes segmenting the digital image into at least two zones, one of which contains the at least one of the plurality of steganographic instruments.

20. The method as defined in claim 10 wherein determining includes:
   comparing attributes of the at least one extracted steganographic instrument with attributes of a plurality of registered steganographic instruments; and
   determining whether the attributes of the at least one extracted steganographic instrument match a predetermined percentage of attributes of at least one of the plurality of registered steganographic instruments.

21. The method as defined in claim 10 wherein the digital image includes at least two of the plurality of steganographic instruments, wherein the at least two of the plurality of steganographic instruments are extracted, and wherein determining includes:
   comparing attributes of each of the at least two extracted steganographic instruments with attributes of a plurality of registered steganographic instruments; and
   determining whether the at least two extracted steganographic instruments correspond with a class of registered steganographic instruments.

22. The method as defined in claim 10, further comprising receiving another digital image of another of the plurality of steganographic instruments, and wherein statistical assurance of authentication of the object is increased.

* * * * *